INVENTOR.
CARL F. BUHRER

BY R. J. Frank
ATTORNEY.

INFORMATION SIGNALS

INFORMATION SIGNALS ON SUBCARRIERS

TRANSMITTED SIGNALS

INVENTOR.
CARL F. BUHRER

BY R. J. Frank
ATTORNEY.

Patented Mar. 25, 1969

3,435,229
SIGNAL TRANSMISSION SYSTEMS
Carl F. Buhrer, Oyster Bay, N.Y., assignor to General Telephone and Electronics Laboratories, Inc., a corporation of Delaware
Filed Mar. 23, 1966, Ser. No. 536,753
Int. Cl. H04b 9/00
U.S. Cl. 250—199 17 Claims

ABSTRACT OF THE DISCLOSURE

An optical carrier is single-sideband modulated whereby independent signals appear as upper and lower sidebands. To increase the bandwidth of the signal transmission system, individual subcarriers are provided with a 90° relative phase shift before they are modulated by the corresponding information signal. As a result, a wideband transmission system is provided in which the phase shift networks employed at the transmitter and at the receiver need only be designed for operation at a discrete subcarrier frequency.

Figure 1:
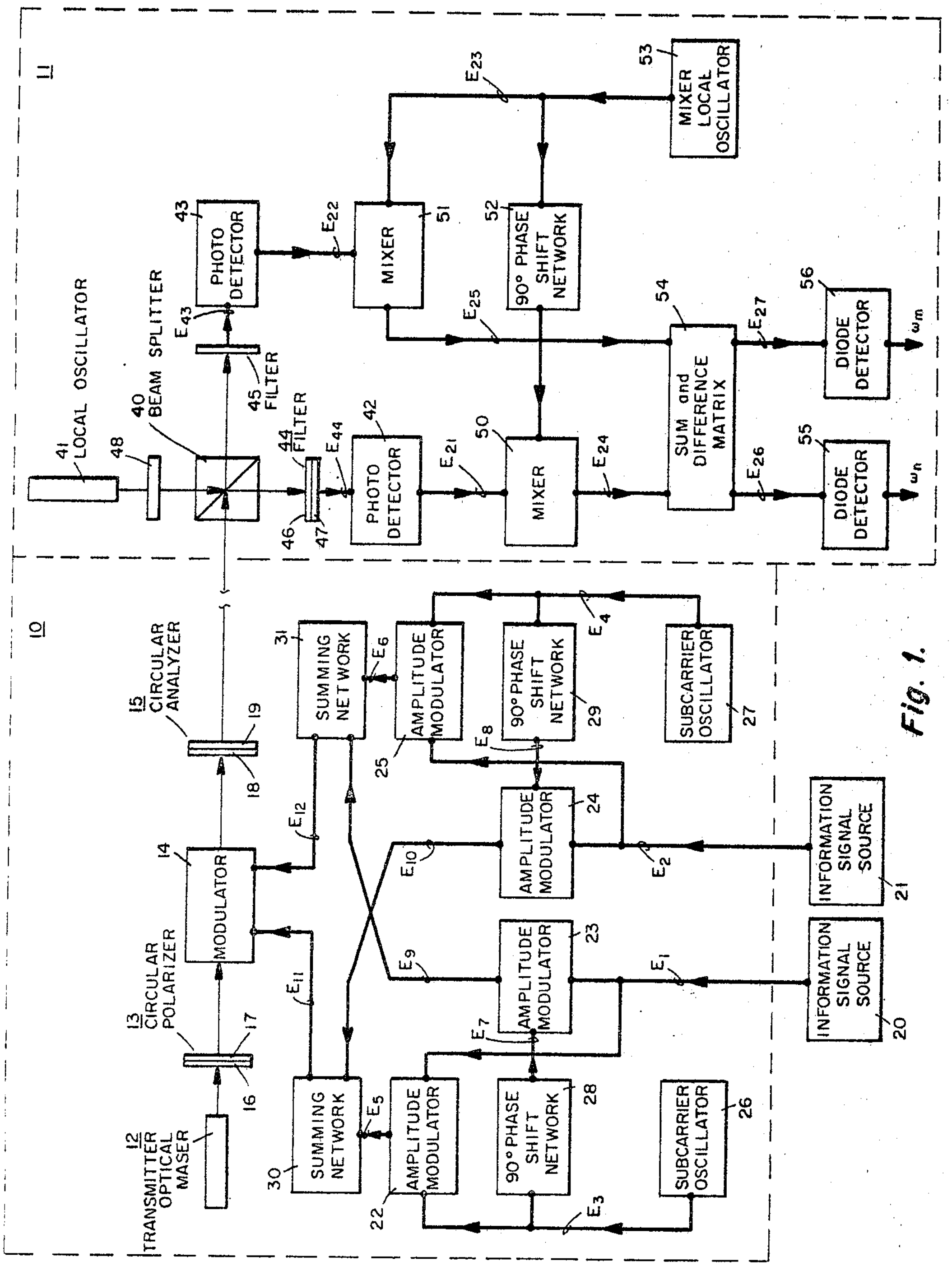

This invention relates to signal transmission systems and in particular to a system for the single-sideband modulation of an electromagnetic carrier.

The generation of coherent light by optical masers has stimulated interest in light communication systems. Such systems exhibit greater directivity and wider bandwidth capacity than conventional microwave channels. Using these systems, it is possible to have a number of wideband communication links operating without interference within sight of each other at nearly the same optical wavelength.

As is well known, an electromagnetic carrier, such as light, which is amplitude-modulated by an information bearing signal may be thought of as consisting of a first signal component varying sinusoidally at the carrier frequency, an upper sideband component varying sinusoidally at the sum of the carrier and modulation frequencies and a lower sideband component varying sinusoidally at the difference between the carrier and modulation frequencies. Each sideband, considered separately, contains all of the information present in the modulated wave, and therefore it is possible to convey the total information represented by a modulating signal by transmitting only a single sideband. Furthermore, the carrier need not be transmitted since it contains none of the intelligence represented by the modulation.

In U.S. Patent No. 3,204,104 to Donald H. Baird et al., a system is described for producing single-sideband modulation of a light beam. By means of this apparatus, a single sideband signal can be transmitted with or without suppression of the carrier. It is also possible to transmit two independent signals, one signal having a sideband frequency above the carrier frequency and the other below.

In the apparatus described in the above-identified U.S. patent, a single-sideband suppressed-carrier modulation is achieved by transmitting a polarized beam of light through a single crystal exhibiting a transverse electro-optic effect while impressing a rotating electric field across the crystal in a plane perpendicular to the direction of light propagation. When the incident beam is circularly polarized, the light emerging from the crystal consists of a first circularly polarized component rotating in the same sense and at the same frequency as the incident beam and a second circularly polarized component rotating in the opposite sense at a frequency differing from that of the incident beam by the frequency of the modulating signal.

The rotating electric field is applied across the crystal by employing an electro-optic crystal having its 3-fold symmetry axis oriented parallel to the direction of light propagation in a structure providing two electric fields orthogonal to each other and to the light beam direction. The electric fields have the same frequency and amplitude but are displaced in phase by 90° thereby producing a rotating field. As explained in the cited patent, the structure employed at light frequencies may consist of four electrodes extending in a direction parallel to the 3-fold axis and placed on opposing surfaces of the crystal. First and second voltages displaced in phase by 90° are applied between appropriate pairs of electrodes. This relative phase shift is provided by passing one of the two voltages through a wide band 90° phase shift network.

When the incident light beam is circularly polarized, the light emerging from the crystal is elliptically polarized and consists of first and second circularly polarized components. The second component may be separated from the first component by a circular polarization analyzer that suppresses the carrier frequency component with the beam emerging from the analyzer having a frequency equal to the carrier frequency ± the modulating frequency. Whether the frequency is upper or lower sideband is determined by the sense of rotation of the electric field relative to that of the incident circularly polarized beam. The same objective may also be accomplished with elliptically polarized light incident on the system but in this case the magnitude of the rotating field must be varied to compensate for the eccentricity of the ellipse. (It shall be noted that a circularly polarized light beam is a special form of elliptically polarized beam in which the major and minor axes are equal.)

An optical superheterodyne system for receiving single sideband light signals from the afore-described transmitter is described in detail in my U.S. Patent 3,215,840, issued Nov. 2, 1965. In this receiving system, the input signal is combined with a coherent local light oscillator signal, operating at the carrier frequency to form first and second composite light signals. Each of the composite light signals have first and second components which correspond to the input and local oscillator signals. The first and second components of each composite signal are mixed in corresponding photodetectors to produce intermediate frequency signals. One of the intermediate frequency signals is then coupled through a 90° sideband phase shift network to a summing network. The other intermediate frequency signal is coupled directly to the summing network whereupon the original modulating signals are recovered.

While the above-described systems have been found to perform quite satisfactorily for modulating signals of moderate bandwidth, the need for supplying one of the modulating signals to a phase shift network has generally limited the use of these systems to applications wherein the modulated subcarrier has a bandwidth of less than 1 or 2 gigacycles. This limitation is due primarily to the fact that phase shift networks presently available do not provide uniform phase shifts over a bandwidth greater than a few gigacycles.

Accordingly, it is an object of the present invention to provide a signal transmission system cable of single-sideband transmission in which the need for phase shifting wide bandwidth signals is eliminated.

A further object is to provide an improved signal transmission system for the single-sideband transmission of wideband modulating signals.

Another object is to provide a single-sideband signal transmission system in which only phase shift networks operating at discrete frequencies need be employed.

In the present invention, a polarized electromagnetic carrier is single-sideband modulated such that a first independent signal appears only as an upper sideband while a second independent signal appears only as a lower sideband. The first and second signals each comprise an individual subcarrier and a corresponding information signal. In this system, the individual subcarriers are provided with a 90° relative phase shift before they are modulated by the corresponding information signal. As a result, each phase shift network employed at the transmitter and at the receiver need only to be designed for operation at a discrete subcarrier frequency.

The transmitter is constructed to operate in the following manner: first and second subcarriers having predetermined frequencies are each applied to an individual amplitude modulator and to an individual 90° phase shift network. The output of each phase shift network is supplied to yet another amplitude modulator.

Each information signal is supplied to the same amplitude modulators to which its corresponding subcarrier is applied. As a result, four amplitude-modulated intermediate signals are provided. Two of these signals comprise subcarriers having zero relative phase shift which are modulated with the corresponding information signals and are referred to herein as A-M signals having a zero phase angle. The other two amplitude-moduated signals comprise subcarriers that are displaced in phase by 90° and modulated with their corresponding information signals. These signals are referred to herein as A-M signals having a 90° phase displacement.

The four A-M intermediate signals are then applied to two summing networks. Each summing network is supplied with an A-M signal having a zero phase angle corresponding to one subcarrier and an A-M signal having a 90° phase displacement corresponding to the other subcarrier. The output signal of each summing network contains components of the first and second independent signals which are used to modulate the carrier.

In the case where a beam of light is employed as the carrier, the output signals from the summing network may be applied to the electrodes of an electro-optic light modulator. Briefly, an electro-optic light modulator employs a medium wherein the application of an electric field causes an anisotropy to be set up such that beams of electromagnetic radiation, with the same direction of propagation but different directions of polarization, travel through the media at different velocities. In particular, there will be one direction of polarization, known as the fast direction, for which the beam velocity is a maximum, while for the polarization direction perpendicular to this, the "slow" direction, the velocity of the beam will be a minimum. If beams of these two different polarizations start moving through the medium together, the one with the slow direction of polarization will be shifted in time phase or retarded with respect to the other. The amount of this retardation due to the induced birefringence in the medium is approximately proportional to the field strength as well as to the path length in the medium.

In one type of signal transmission system constructed in accordance with the invention and employing an electro-optic modulator, a polarized beam of light directed through the medium is modulated by the first and second signals applied to the modulating medium passed through an analyzer to absorb the carrier and to plane polarize the sidebands which are then transmitted to a remote receiver. This received signal consists of plane polarized upper and lower sidebands with each sideband containing one of the information signals. At the receiver, the input signal is combined with a coherent local light oscillator signal operating at the frequency to form first and second composite light signals. Each of the composite light signals have first and second components which correspond to the input and local oscillator signals. Phase shift means are provided to produce an instantaneous angular phase difference between the first and second components of the first composite signal which differs by 90° from the instantaneous angular phase difference between the first and second components of the second composite signal. This phase difference between components is obtained by placing a quarter-wave plate in either of the two composite beams.

The first and second components of each composite signal are mixed in a corresponding photodetector to produce intermediate frequency signals. The intermediate signal from each photodetector is supplied to a corresponding mixer. The mixers are coupled to the output of a local oscillator. One mixer is connected directly to the output of the local oscillator while the other mixer is coupled thereto through a 90° phase shift network. The output of each mixer is supplied to a matrix which provides first and second output signals equal to the sum and difference respectively of the signals applied thereto. These output signals are then supplied to individual detectors which demodulate these signals to recover the original information signals. It shall be noted that the phase shift networks employed in both the receiver and transmitter need operate only at discrete frequencies and therefore place no limitation on the bandwidth of the information signals.

Further features and advantages of the invention will become more readily apparent from the following detailed description of a specific embodiment when taken in conjunction with the accompanying drawings, in which:

FIG. 1 is a block schematic diagram of one embodiment of the invention, and

FIGS. 2*a*–2*e* show the frequency spectra useful in explaining the operation of the embodiment of FIG. 1.

Referring to FIG. 1, there is shown a diagram of a transmission system comprising a transmitter 10 for modulating a beam of polarized electromagnetic radiation by two independent varying signals and a receiver 11 for separating and detecting these signals.

The transmitter 10 includes a light source 12, a circular polarizer 13, a carrier modulator 14, and a circular analyzer 15. Source 12 is a coherent light source such as an optical maser.

The light from source 12 is propagated through the circular polarizer 13 in the direction shown. The polarizer consists of a plane polarizer 16 positioned to transmit light with its electric vector oriented in a particular direction in a plane transverse to the direction of propagation and a quarter-wave birefringent plate 17 having its fast polarization direction rotated in the transverse plane through an angle of 45° relative to the direction of the polarizer. The direction of rotation of plate 17 determines whether the light beam is left or right circularly polarized. It will be noted that if the source emits plane polarized light, a quarter-wave birefringent plate may be substituted for the circular polarizer 13.

The quarter-wave birefringent plate 16 may consist of a thin sheet of split mica or quartz cut parallel to its optic axes and having a thickness which produces a 90° relative phase shift between light components in the transverse plane having directions of polarization therein which are normal to each other. As a result, the light entering modulator 14 is circularly polarized; i.e., the electric vector of the electromagnetic wave rotates in the transverse plane as it is propagated in the direction shown.

A circular analyzer 15 having a rotational sense opposite to that of circular polarizer 13 and comprising a quarter-wave birefringent plate 18 and a linear polarizer 19 having its direction oriented at 45° with respect to the axes of plate 18 is located in the transmission path subsequent to carrier modulator 14. Since the circular polarizer and analyzer are crossed, components of the light beam emerging from the modulator that are circularly polarized with their direction of rotation the same as that imparted by polarizer 13 are not transmitted. Therefore, the carrier, which in this case is a light beam, is suppressed. The signals passed by circular analyzer 15 are plane polarized due to polarizer 19.

Modulator 14 contains a crystal exhibiting a dual transverse electro-optic effect and having a 3-fold symmetry axis extending in the direction of light propagation. Light propagating through the crystal under the influence of an electric field in a given direction has a velocity which is dependent upon the direction of polarization of the light. The polarization direction for which the light has a maximum velocity (the fast direction) is that in which the refractive index of the crystal is a minimum, and the direction for which the light has a minimum velocity (the slow direction) is that in which the refractive index is a maximum. These directions are at right angles to each other and are perpendicular to the direction of light propagation.

The circularly polarized light beam is directed through the modulator in a direction parallel to a 3-fold symmetry axis of the crystal. Generally, the modulating signals are applied to the crystal by employing first and second pairs of electrodes secured to opposite sides of the crystal and extending parallel to the 3-fold axis. One type of modulator structure found to be especially suited for use in the present system is described in detail in U.S. Patent 3,204,104 to D. H. Baird et al. However, other types of modulators as described in my copending application Ser. No. 383,126, filed July 16, 1964, such as those employing electro-optic or magneto-optic cells in place of the one dual transverse electro-optic crystal or Faraday cell modulators, may be employed if desired.

In embodiments employing a carrier modulator containing first and second electro-optic crystals which are optically uniaxial and do not exhibit a dual transverse effect, the crystals are oriented so that the light propagates along their optic axis and rotated so that their axes of induced birefringence are displaced by 45° about the direction of propagation of the beam. Each modulating signal is applied between electrodes mounted on opposing surfaces of one crystal. The light emerging from the modulator comprises a polarization modulated carrier hav- two single sidebands and, in this case, circular analyzer 15 may be omitted.

Alternatively, the quarter-wave plate 17 of circular polarizer 13 may be located between the first and second crystals with an additional quarter-wave plate located subsequent to the second cell. The light emerging is similarly polarization modulated. In this modulator, the first and second electro-optic crystals may be replaced by two Farady rotator cells consisting of a material, such as lead glass, having a high Verdet constant.

The signals $E_{11}$ and $E_{12}$ applied to the modulator 14 of FIG. 1 are provided in accordance with the following description. First and second information signal sources 20 and 21 having signals $E_1$ and $E_2$ appearing at their respective output terminals are each coupled to two amplitude modulators. As shown, the output terminal of source 20 is coupled to one input terminal of amplitude modulators 22 and 23. Similarly, the output terminal of source 21 is coupled to one input terminal of amplitude modulators 24 and 25.

The output terminal of subcarrier oscillator 26 is coupled to an input terminal 22 and to the input terminal of 90° phase shift network 28. Further, the output terminal of network 28 is coupled to an input terminal of modulator 23. As a result, the subcarrier $E_3$ provided by oscillator 26 is modulated with information signal $E_1$ by modulator 22 so that the signal $E_5$ appearing at its output terminal is an A-M signal. In addition, the subcarrier $E_3$ is supplied to network 28 wherein it is displaced in phase by 90° to form signal $E_7$ which is applied to modulator 23. The signal $E_9$ appearing at the output terminal of modulator 23 is an A-M signal having a 90° phase displacement relative to signal $E_5$.

The processing of subcarrier $E_4$ and information signal $E_2$ is similar to that described above so that intermediate signals $E_6$ and $E_{10}$ appearing at the output terminals of modulators 25 and 24 respectively are both A-M signals of essentially equal amplitude with signal $E_{10}$ being 90° out of phase relative to intermediate signal $E_6$.

The output terminals of amplitude modulators 22 and 24 are coupled to the input terminals of summing network 30. The signal $E_{11}$ appearing at the output terminal of network 30 is equal to the sum of signals $E_5$ and $E_{10}$. Similarly, the signal $E_{12}$ appearing at the output terminal of network 31 is equal to the sum of signals $E_9$ and $E_6$. As shown, the output terminals of summing networks 30 and 31 are coupled to input terminals of modulator 14. In the case of electro-optic light modulator containing an electro-optic crystal exhibiting a dual transverse effect, signals $E_{11}$ and $E_{12}$ are each applied to the electro-optic crystal.

More specifically, if the first and second information signals $E_1$ and $E_2$ have the form $E_1 = E_n \cos \omega_n t$;

$$E_2 = E_m \cos \omega_m t$$

and the first and second subcarriers have the form $E_3 = E_q \sin \omega_q t$; $E_4 = E_p \cos \omega_p t$, so that the signals $E_8 = E_p \sin \omega_p t$, the signals appearing at the output terminals of amplitude modulators 22, 23, 24 and 25 will be $$E_5 = (1 + E_n \cos \omega_n t)(E_q \sin \omega_q t)$$
$$E_9 = (1 + E_n \cos \omega_n t)(-E_q \cos \omega_q t)$$
$$E_{10} = (1 + E_m \cos \omega_m t)(E_p \sin \omega_p t)$$
$$E_6 = (1 + E_m \cos \omega_m t)(E_p \cos \omega_p t)$$

respectively. It will be noted that in the above equations $E_n$ and $E_m$ are the amplitudes and $\omega_n$ and $\omega_m$ the frequencies of the first and second information signals $E_1$ and $E_2$ respectively and $E_q$ and $E_p$ are the amplitudes and $\omega_q$ and $\omega_p$ the frequencies of the first and second subcarriers $E_3$ and $E_4$ respectively.

The signals $E_{11}$ and $E_{12}$ appearing at the output terminals of summing networks 30 and 31 have the form $$E_{11} = (1 + E_m \cos \omega_m t)(E_p \sin \omega_p t) + (1 + E_n \cos \omega_n t)(E_q \sin \omega_q t)$$
$$E_{12} = (1 + E_m \cos \omega_m t)(E_p \cos \omega_p t) - (1 + E_n \cos \omega_n t)(E_q \cos \omega_q t)$$

These signals are coupled to the input terminals of modulator 14 wherein they are applied across the electro-optic crystal. Although the modulator is shown single-ended, it shall be understood that signals $E_{11}$ and $E_{12}$ are each applied across opposing faces of the crystal such that the resulting fields are orthogonal to each other and to the direction of propagation. At microwave frequencies, a waveguide structure capable of supporting two orthogonal transverse electric fields may be employed. While the above description refers to the modulation of a carrier by first and second independent signals, it shall be noted that if a single independent signal is employed the summing networks may be omitted.

Figure 2A:
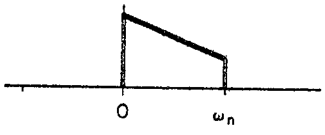
Figure 2B:
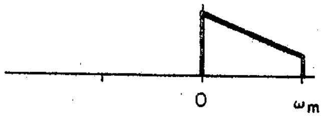
Figure 2C:
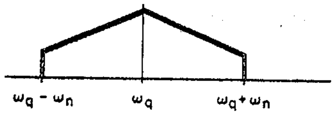
Figure 2D:
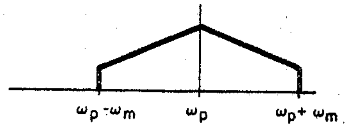
Figure 2E:
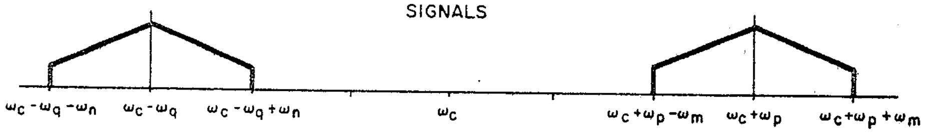

The frequency spectra of FIGS. 2*a* through 2*e* illustrate the synthesis of the transmitted signal which may be expressed as $P \cos (\omega_c + \omega_p)t + Q \cos (\omega_c - \omega_q)t$ where P and Q are the amplitudes of the sidebands. FIGS. 2*a* and 2*b* show the first and second information signals $E_1$ and $E_2$ respectively. FIGS. 2*c* and 2*d* show the subcarriers $E_3$ and $E_4$ modulated to form signals $E_5$, $E_6$, $E_9$ and $E_{10}$. The frequency spectra of the transmitted signal is shown in FIG. 2*e* as comprising a single lower sideband of the first modulated subcarrier and a single upper sideband of the second modulated subcarrier. While two subcarriers are shown, in practice one or many subcarriers may be transmitted provided their sidebands do not overlap.

At the receiver 11, the light beam is combined with the output signal of a coherent local light oscillator 41, which for example is an optical maser, operating substantially at the carrier frequency. The output signal of the local oscillator is a plane polarized light beam having its direction of polarization orthogonal to the direction of polarization of the received signal. The direction of polarization of the received signal is determined by the orientation of polarizer 19 of circular analyzer 15. The polarizer 48 located in the path of the output beam of local oscillator is oriented such that the light beam passed by it has its electric vector orthogonal to that of the received signal. If the output of the oscillator 41 is plane polarized in the appropriate direction, polarizer 48 may be omitted.

The local oscillator and received light beams are combined in beam splitter 40 to form first and second composite signals. Each of the composite light signals have first and second components which correspond to the input and local oscillator signals and are passed through one of filters 44 and 45. Filter 45 comprises a polarizer oriented at 45° with respect to the electric vectors of the first and second components of the first composite signals. Therefore, both components are passed at half intensity with a common polarization direction by filter 45 and illuminate the surface of a photodetector 43. The second composite beam is passed through filter 44 comprising a quarter-wave plate 46 having its fast direction parallel to the electric vector of the received signal component of the second beam and a polarizer 47 oriented at 45° with respect to the electric vectors of the first and second components of the second beam. Both components are passed at half intensity with a common polarization direction by filter 44 and illuminate the surface of photodetector 42. It shall be noted that filter 44 provides an instantaneous angular phase difference (in time) between the first and second components of the second composite signal which differs by 90° from the instantaneous angular phase difference between the first and second components of the first composite signal. Also, filter 44 comprises a circular polarization analyzer and rotation of its unit changes only the plane of polarization of the light reaching the photodetector and does not affect the operation of the system.

The first and second components of each composite signal are mixed in a photodetector to produce a corresponding intermediate frequency (IF) signal. The signal appearing at the output terminal of photodetector 43 is a first IF signal an instantaneous frequency equal to the difference between the frequency of the received signal and the local oscillator frequency. Similarly, the second IF signal appearing at the output of photodetector 42 has an instantaneous frequency equal to the difference between that of the received and oscillator signals. In other words, the signals $E_{22}$ and $E_{21}$ from photodetectors 43 and 42 respectively each contain components having frequencies within the frequency spectra of the sidebands shown in FIGS. 2*c* and 2*d*.

The output $E_{22}$ of photodetector 43 is coupled to the first input of mixer 51 while the output $E_{21}$ of photodetector 42 is coupled to the first input of mixer 50. The output $E_{23}$ of a mixer local oscillator 53 having a frequency of $\omega_o$ is coupled directly to the second input of mixer 51 and coupled through 90° phase shift network 52 to the second input of mixer 50. It shall be noted that the phase shift network 52 need only operate at the single frequency $\omega_o$ of oscillator 53.

The outputs $E_{24}$ and $E_{25}$ of mixers 50 and 51 respectively each contain components having frequencies between $\omega_r-\omega_m$ and $\omega_r+\omega_m$ and between $\omega_s-\omega_n$ and $\omega_s+\omega_n$ where $\omega_r=\omega_p+\omega_o$ and $\omega_s=\omega_q+\omega_o$. The mixer outputs $E_{24}$ and $E_{25}$ are in time phase for one sideband and 180° apart in phase for the other sideband and are coupled to a sum and difference matrix 54 having two output teminals. The matrix 54 produces a first output signal $E_{26}$ proportional to the algebraic sum of the input signals $E_{24}$ and $E_{25}$ and a second output signal $E_{27}$ proportional to the algebraic difference of the input signals $E_{24}$ and $E_{25}$.

The sum and difference matrix therefore produces two output signals in which the upper-sideband signal is separated from the lower-sideband signal. Each of the matrix output signals $E_{26}$ and $E_{27}$ are supplied to a corresponding diode detector 55 and 56 respectively wherein the subcarrier signals are demodulated to recover the original information signals.

The operation of the receiver may be described by considering the received signal to have the form $$\text{Received beam}=P\cos(\omega_c+\omega_p)t+Q\cos(\omega_c-\omega_q)t$$

and the local oscillator beam to have the form $$\text{Local oscillator}=E_c\cos(\omega_c+\delta)$$

where $\delta$ is an arbitrary phase angle between the local oscillator and the suppressed carrier and $E_c$ is the amplitude.

After combination in the beam splitter 40 and passing through filter 45, the signal at photodetector 43 has the form $$E_{43}=1/\sqrt{2}[P\cos(\omega_c+\omega_p)t+Q\cos(\omega_c-\omega_q)t+E_c\cos(\omega_ct+\delta)]$$

with the constant $1/\sqrt{2}$ appearing as a result of the orientation of filter 45.

Further, the signal appearing at photoconductor 42 has the form $$E_{44}=1/\sqrt{2}[-P\sin(\omega_c+\omega_p)t-Q\sin(\omega_c-\omega_q)t+E_c\cos(\omega_ct+\delta)]$$

due to the phase shift provided by quarter-wave plate 46 of filter 44. Neglecting higher order terms having relatively small amplitudes and any constant terms the signals $E_{22}$ and $E_{21}$ have the form $$E_{22}=E_c[P\cos(\omega_pt-\delta)+Q\cos(\omega_qt+\delta)]$$

$$E_{21}=E_c[-P\sin(\omega_pt-\delta)+Q\sin(\omega_qt+\delta)]$$

When signals $E_{22}$ and $E_{21}$ are mixed with the signal $E_{23}$ having a frequency $\omega_o$ of mixer local oscillator 53, the form of signals $E_{25}$ and $E_{24}$ becomes $$E_{25}=E_c[P\cos(\omega_ot+\omega_pt-\delta)+Q\cos(\omega_ot+\omega_qt+\delta)]$$

and $$E_{24}=E_c[P\cos(\omega_ot+\omega_pt-\delta)-Q\cos(\omega_ot+\omega_qt+\delta)]$$

It shall be noted that the local oscillator signal $E_{23}$ is displaced in phase by 90 degrees before being applied to mixer 50. As a result, signals $E_{24}$ and $E_{25}$ are 180° out of phase and when added and subtracted in matrix 54 provide signals $E_{26}$ and $E_{27}$ containing either the upper- or lower-sidebands.

Although the foregoing description has referred to a specific embodiment of the invention whereon the carrier is suppressed by circular analyzer 15 at the transmitter, the invention may also be employed in single-sideband polarization modulation systems whereon analyzer 15 is omitted at the transmitter. In this type of system, local oscillator 41 is omitted at the receiver. Further, a quarter-wave plate may be located at the receiver prior to beam splitter 40 to convert the circular polarized signals to linearly polarized signals if the particular beam splitter employed is found to introduce angular phase differences in splitting circularly polarized beams. In addition, many other modifications and variations may be made in the described embodiment without departing from the spirit and scope of the invention.

What is claimed is:

1. In a signal transmission system for the single-sideband modulation of a polarized beam of electromagnetic radiation by an independent signal containing a subcarrier modulated in accordance with an information signal, a transmitter comprising:

(a) carrier modulation means positioned in the path of said polarized beam of electromagnetic radiation, said means having first and second input terminals;
(b) first amplitude modulation means having first and second input terminals and an output terminal, said output terminal being coupled to the first input terminal of said carrier modulation means;
(c) second amplitude modulation means having first and second input terminals and an output terminal, said output terminal being coupled to the second input terminal of said carrier modulation means, an information signal being applied to the first input terminals of said first and second amplitude modulation means; and
(d) means for applying subcarrier signals to the second input terminals of said first and second amplitude modulation means, said means providing a 90° phase displacement between the signals applied to the second input terminals of said first and second amplitude modulation means, said signals being amplitude modulated by the information signal, the radiation emerging from said carrier modulation means having a single sideband thereon containing the independent signal.

2. Apparatus in accordance with claim 1 in which said means for applying subcarrier signals to said first and second amplitude modulation means comprises (a) means for generating a subcarrier, said means having an output terminal, said output terminal being connected to the second input terminal of said second amplitude modulating means, and
(b) a 90° phase shift network having an input and an output terminal, said input terminal being connected to the output terminal of the generating means, said output terminal being connected to the second input terminal of said first amplitude modulation means.

3. In a signal transmission system for the single-sideband modulation of a polarized beam of electromagnetic radiation by first and second independent signals, each of said independent signals containing a subcarrier modulated in accordance with a corresponding information signal, a transmitter comprising:

(a) carrier modulation means positioned in the path of said polarized beam of electromagnetic radiation, said means having first and second input terminals;
(b) first amplitude modulation means having first and second input terminals and an output terminal;
(c) second amplitude modulation means having first and second input terminals and an output terminal, a first information signal being applied to the first input terminals of said first and second amplitude modulation means;
(d) first subcarrier means for applying first subcarrier signals to the second input terminals of said first and second amplitude modulation means, said means producing a 90° phase displacement between the signals applied to said first and second amplitude modulation means, said first subcarrier signals being amplitude modulated by the first information signal;
(e) third amplitude modulation means having first and second input terminals and an output terminal;
(f) fourth amplitude modulation means having first and second input terminals and an output terminal, a second information signal being applied to the first input terminals of said third and fourth amplitude modulation means;
(g) second subcarrier means for applying second subcarrier signals to the second input terminals of said third and fourth amplitude modulation means, said means producing a 90° phase displacement between the signals applied to said first and second amplitude modulation means, said second subcarrier signals being amplitude modulated by the second information signal;
(h) first coupling means for coupling the output terminals of said first and third amplitude modulation means to the first input terminal of said carrier modulation means; and
(i) second coupling means for coupling the output terminals of said second and fourth amplitude modulation means to the second input terminal of said carrier modulation means, the radiation emerging from said carrier modulation means having first and second sidebands containing said first and second independent signals, respectively.

4. Apparatus in accordance with claim 3 in which said first and second coupling means comprise respectively (a) a first summing matrix having first and second input terminals and an output terminal, said first and second input terminals being connected to the output terminals of said first and third amplitude modulation means respectively, said output terminal being connected to the first input terminal of said carrier modulation means, and
(b) a second summing matrix having first and second input terminals and an output terminal, said first and second input terminals being connected to the output terminals of said second and fourth amplitude modulation means respectively, said output terminal being connected to the second input terminal of said carrier modulation means.

5. Apparatus in accordance with claim 4 in which said first subcarrier means comprises (a) means for generating a first subcarrier signal, said means having an output terminal, said output terminal being connected to the second input terminal of said second amplitude modulating means, and
(b) a first 90° phase shift network having an input and an output terminal, said input terminal being connected to the output terminal of said generating means, said output terminal being connected to the second input terminal of said first amplitude modulation means, and in which said second subcarrier means comprises
(c) means for generating a second subcarrier signal, said means having an output terminal, said output terminal being connected to the second input terminal of said fourth amplitude modulation means, and
(d) a second 90° phase shift network having an input and an output terminal, said input terminal being connected to the output terminal of said generating means, said output terminal being connected to the second input terminal of said first amplitude modulation means.

6. Apparatus in accordance with claim 5 further comprising (a) a source of coherent light and
(b) circularly polarizing means disposed in the path of the beam emitted by said light source prior to said carrier modulation means, said means circularly polarizing said beam so that its electric vector rotates in a first direction.

7. Apparatus in accordance with claim 6 further comprising a circular analyzer disposed in the path of the beam subsequent to said carrier modulation means, said analyzer having a rotational sense opposite to that of said circularly polarizing means whereby components of the beam emerging from said modulation means having their electric vector rotating in said first direction are suppressed.

8. In a signal transmission system wherein a polarized beam of electromagnetic radiation is single-sideband modulated by first and second independent signals, each of said independent signals containing a subcarrier modulated in accordance with an information signal, a receiver comprising (a) means for dividing said beam into first and second composite signals, each of said composite signals having first and second components;

(b) means positioned in the path of said first composite signal for providing an angular phase difference between the first and second components of said first composite signal which differs by 90° from the angular phase difference between the first and second components of the second composite signal;

(c) a first photodetector positioned in the path of the first composite signal emerging from said means, said photodetector having an output terminal;

(d) a second photodetector positioned in the path of the second composite signal, said photodetector having an output terminal;

(e) a first mixer having first and second input terminals and an output terminal, said first input terminal being connected to the output terminal of said first photodetector;

(f) a second mixer having first and second input terminals and an output terminal, said first input terminal being connected to the output terminal of said second photodetector;

(g) means for applying mixing signals to the second input terminals of said first and second mixers, said means providing a 90° phase displacement between the signals applied to the second input terminals of said first and second mixers, and (h) a sum and difference matrix having first and second input terminals and first and second output terminals, said first and second input terminals being connected to the output terminals of said first and second mixers respectively, the signals appearing at the first and second output terminals of said matrix each containing an information signal.

9. Apparatus in accordance with claim 8 in which said means for applying mixing signals to said first and second mixers comprises (a) means for generating a mixing signal, said means having an output terminal, said output terminal being connected to the second input terminal of said second mixer, and (b) a 90° phase shift network having an input and an output terminal, said input terminal being connected to the output terminal of the generating means, said output terminal being connected to the second input terminal of said first mixer.

10. Apparatus in accordance with claim 8 further comprising (a) a first detector having an input and an output terminal, said input terminal being connected to the first output terminal of said matrix, and (b) a second detector having an input and output terminal, said input terminal being connected to the second output terminal of said matrix, said detectors demodulating the output signals of said matrix whereby the output signal of each detector corresponds to an information signal.

11. Apparatus in accordance with claim 10 wherein the received sidebands are plane polarized further comprising (a) means for providing a plane polarized beam of coherent light, the direction of polarization of said beam being orthogonal to that of said sidebands, said beam being combined with the received sidebands in the beam splitter, and (b) a plane polarizer interposed between said beam splitter and said second photodetector, said plane polarizer having a direction of polarization substantially 45° from that of said received sidebands, and in which said means positioned in the path of said first complete signal for providing an angular phase difference of 90° between the first and second components thereof comprises (c) a quarter-wave birefringent plate having its fast direction parallel to the direction of polarization of said received signal and (d) a plane polarizer having a direction of polarization substantially 45° from that of said received signal.

12. A signal transmission system for the single-sideband modulation of a circularly polarized beam of electromagnetic radiation by independent signal containing a subcarrier modulated in accordance with an information signal which comprises (1) a transmitter comprising (a) carrier modulation means positioned in the path of said polarized beam of electromagnetic radiation, said means having first and second input terminals;

(b) first amplitude modulation means having first and second input terminals and an output terminal, said output terminal being coupled to the first input terminal of said carrier modulation means;

(c) second amplitude modulation means having first and second input terminals and an output terminal, said output teminal being coupled to the second input terminal of said carrier modulation means, an information signal being applied to the first input terminals of said first and second amplitude modulation means; and (d) means for applying subcarrier signals to the second input terminals of said first and second amplitude modulation means, said means providing a 90° phase displacement between the signals applied to the second input terminals of said first and second amplitude modulation means, said signals being amplitude modulated by the information signal, the radiation emerging from said carrier modulation means having a single-sideband thereon containing the independent signal, and (2) a receiver comprising (e) means for dividing said beam into first and second composite signals, each of said composite signals having first and second components;

(f) means positioned in the path of said first composite signal for providing an angular phase difference between the first and second components of said first composite signal which differs by 90° from the angular phase difference between the first and second components of the second composite signal;

(g) a first photodetector positioned in the path of the first composite signal emerging from said means, said photodetector having an output terminal;

(h) a second photodetector positioned in the path of the second composite signal, said photodetector having an output terminal;

(i) a first mixer having first and second input terminals and an output terminal, said first input terminal being connected to the output terminal of said first photodetector;

(j) a second mixer having first and second input terminals and an output terminal, said first input terminal being connected to the output terminal of said second photodetector;

(k) means for applying mixing signals to the second input terminals of said first and second mixers, said means providing a 90° phase displacement between the signals applied to the second input terminals of said first and second mixers, and (l) a sum and difference matrix having first and second input terminals and first and second output terminals, said first and second input terminals being connected to the output terminals of said first and second mixers respectively, said information signal being contained in the signal appearing at one of said matrix output terminals.

13. Apparatus in accordance with claim 10 in which said means for applying subcarrier signals to said first and second amplitude modulation means comprises
(a) means for generating a subcarrier, said means having an output terminal, said output terminal being connected to the second input terminal of said second amplitude modulation means, and
(b) a 90° phase shift network having an input and output terminal, said input terminal being connected an output terminal of the generating means, said output terminal being connected to the second input terminal of said first amplitude modulation means.

14. Apparatus in accordance with claim 13 in which said means for applying mixing signals to said first and second mixers comprises
(a) means for generating a mixing signal, said means having an output terminal, said output terminal being connected to the second input terminal of said second mixer, and
(b) a 90° phase shift network having an input and an output terminal, said input terminal being connected to the output terminal of the generating means, said output terminal being connected to the second input terminal of said first mixer.

15. A signal transmission system for the single-sideband modulation of a circularly polarized beam of electromagnetic radiation by first and second independent signals, each of said independent signals containing a subcarrier modulated in accordance with a corresponding information signal which comprises:
(1) a transmitter comprising
(a) carrier modulation means positioned in the path of said polarized beam of electromagnetic radiation, said means having first and second input terminals;
(b) first amplitude modulation means having first and second input terminals and an output terminal;
(c) second amplitude modulation means having first and second input terminals and an output terminal, a first information signal being applied to the first input terminals of said first and second amplitude modulation means;
(d) first subcarrier means for applying first subcarrier signals to the second input terminals of said first and second amplitude modulation means, said means producing a 90° phase displacement between the signals applied to said first and second amplitude modulation means, said first subcarrier signals being amplitude modulated by the first information signal;
(e) third amplitude modulation means having first and and second input terminals and an output terminal;
(f) fourth amplitude modulation means having first and second input terminals and an output terminal, a second information signal being applied to the first input terminals of said third and fourth amplitude modulation means;
(g) second subcarrier means for applying second subcarrier signals to the second input terminals of said third and fourth amplitude modulation means, said means producing a 90° phase displacement between the signals applied to said first and second amplitude modulation means, said second subcarrier signals being amplitude modulated by the second information signal;
(h) first coupling means for coupling the output terminals of said first and third amplitude modulation means to the first input terminal of said carrier modulation means;
(i) second coupling means for coupling the output terminals of said second and fourth amplitude modulation means to the second input terminal of said carrier modulation means, the radiation emerging from said carrier modulation means having first and second sidebands containing said first and second independent signals respectively, and
(2) a receiver comprising
(j) means for dividing said beam into first and second composite signals, each of said composite signals having first and second components;
(k) means positioned in the path of said first composite signal for providing an angular phase difference between the first and second components of said first composite signal which differs by 90° from the angular phase difference between the first and second components of the second composite signal;
(l) a first photodetector positioned in the path of the first composite signal emerging from said means, said photodetector having an output terminal;
(m) a second photodetector positioned in the path of the second composite signal, said photodetector having an output terminal;
(n) a first mixer having first and second input terminals and an output terminal, said first input terminals being connected to the output terminal of said first photodetector;
(o) a second mixer having first and second input terminals and an output terminal, said first input terminal being connected to the output terminal of said second photodetector;
(p) means for applying mixing signals to the second input terminals of said first and second mixers, said means providing a 90° phase displacement between the signals applied to the second input terminals of said first and second mixers, and
(q) a sum and difference matrix having first and second input terminals and first and second output terminals, said first and second input terminals being connected to the output terminals of said first and second mixers respectively, the signals appearing at the first and second output terminals of said matrix each containing an information signal.

16. Apparatus in accordance with claim 15 in which said first subcarrier means comprises
(a) means for generating a first subcarrier signal, said means having an output terminal, said output terminal being connected to the second input terminal of said second amplitude modulation means, and
(b) a first 90° phase shift network having an input and an output terminal, said input terminal being connected to the output terminal of said generating means, said output terminal being connected to the second input terminal of said first amplitude modulation means, and in which said second subcarrier means comprises
(c) means for generating a second subcarrier signal, said means having an output terminal, said output terminal being connected to the second input terminal of said fourth amplitude modulation means, and
(d) a second 90° phase shift network having an input and an output terminal, said input terminal being connected to the output terminal of said generating means, said output terminal being connected to the second input terminal of said first amplitude modulation means.

17. Apparatus in accordance with claim 16 in which said means for applying mixing signals to said first and second mixers comprises
(a) means for generating a mixing signal, said means having an output terminal, said output terminal being connected to the second input terminal of said second mixer, and (b) a 90° phase shift network having an input and an output terminal, said input terminal being connected to the output terminal of the generating means, said output terminal being connected to the second input terminal of said first mixer.

References Cited

UNITED STATES PATENTS

| | | | |
|---|---|---|---|
| 2,944,113 | 7/1960 | Wehde et al. | |
| 2,960,573 | 11/1960 | Hodgson et al. | |
| 3,204,104 | 8/1965 | Baird et al. | 250—199 |
| 3,215,840 | 11/1965 | Buhrer | 250—199 |
| 3,239,671 | 3/1966 | Buhrer | 250—199 |
| 3,272,988 | 9/1966 | Bloom et al. | 250—199 |

ROBERT L. GRIFFIN, *Primary Examiner.*

ALBERT J. MAYER, *Assistant Examiner.*

U.S. Cl. X.R.

179—15.55; 332—7.51